UNITED STATES PATENT OFFICE.

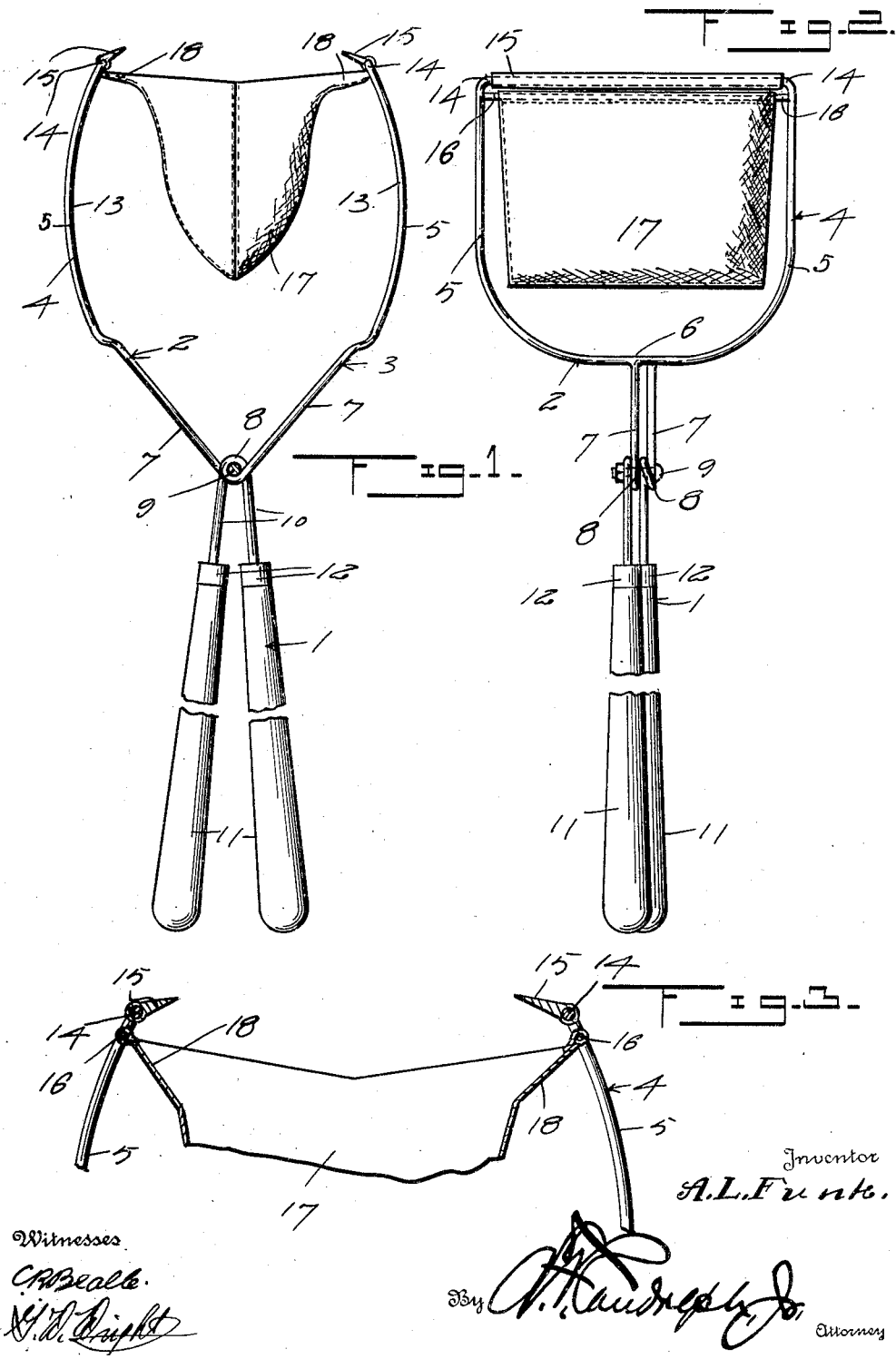

ANNA L. FUNK, OF PETERSON, IOWA.

FRUIT-PICKER.

1,330,699.　　　　Specification of Letters Patent.　　Patented Feb. 10, 1920.

Application filed July 6, 1917. Serial No. 178,985.

*To all whom it may concern:*

Be it known that I, ANNA L. FUNK, a citizen of the United States, residing at Peterson, in the county of Clay and State of Iowa, have invented certain new and useful Improvements in Fruit-Pickers; and I do hereby declare the following to be a full, clear, and exact description of the invention, such as will enable others skilled in the art to which it appertains to make and use the same.

This invention relates to fruit pickers and the primary object of the invention is to improve and simplify the ordinary type of fruit pickers and to provide means whereby fruit can be picked from a tree one at a time, so that the fruit will not be bruised during the picking operation.

Another object of the invention is to provide a pair of pivoted jaws, having a sharp knife extending the full length of the same and having a small bag positioned between the same, said jaws being mounted on a pair of long operating handles so that fruit can be picked from the topmost branches of a tree from the ground without bruising the fruit.

A further object of the invention is to provide a fruit picker of the above character, which will be durable and efficient in use and one that will be simple and inexpensive to manufacture and one that can be placed upon the market at a reasonable price.

With these and other objects in view the invention consists in the novel construction, arrangement and formation of parts as will be hereinafter specifically described, claimed and illustrated in the accompanying drawing, forming a part thereof, in which—

Figure 1 is a side elevation of the improved fruit picker,

Fig. 2 is a front elevation of the improved fruit picker, and

Fig. 3 is a fragmentary detail sectional view of the upper portion of the fruit picker showing the manner of supporting the fruit catching sack and the means for mounting the stem cutting blades.

Referring to the drawing in detail, wherein similar reference numerals designate corresponding parts throughout the several views, the numeral 1 generally indicates the improved fruit picker which includes a pair of jaws 2 and 3 respectively, each of which is preferably formed of a single strand of wire or like material. The jaws 2 and 3 are each bent to form the substantially inverted U-shaped frame 4 which have their legs 5 bent inwardly toward each other and secured together as at 6 to form a substantially inclosed supporting frame. One of the legs 5 of each frame 4 is continued downwardly and these legs are then bent inwardly toward each other as at 7, then coiled as at 8 around a pivot pin 9 which pivotally supports the U-shaped members 4 together. The legs 5 are then continued downwardly to provide the shanks 10 to which is secured the operating handles 11, which are secured in position by means of the ferrules 12. The operating handles 11 are preferably formed about six feet long so that the upper branches of a fruit tree can be conveniently reached.

Each leg 5 of the U-shaped frames 4 is bent arcuately as at 13 so as to position the bight portions 14 of the frames adjacent each other and each of the bight portions 14 have rigidly secured thereto the elongated knife 15 which is adapted to clip the stems of the fruit. A supporting rod 16 extends from one leg 5 to the opposite leg and is positioned adjacent the bight portion 15 and is received in suitable apertures formed in the legs and supports a canvas bag 17. The canvas bag 17 has its side walls 18 extended and looped over the supporting rod 16 and sewed so as to support the same in place.

In operation of the improved device the operating handles 11 are moved so as to position the cutting edges 16 from each other and then the fruit picker is positioned over the desired fruit to be picked and the operating handles are then moved so as to bring the cutting knives 16 together, which will clip the stem of the fruit and the same will then drop in the canvas sack 17 and then the fruit picker can be lowered to the ground and the fruit taken from the canvas bag and laid in a suitable receptacle. By this operation the bruising of the fruit is reduced to a minimum.

In practice, I have found that the form of my invention, illustrated in the accompanying drawing and referred to in the above description, as the preferred embodiment, is the most efficient and practical; yet realizing the conditions concurrent with the adoption of my device will necessarily vary, I desire to emphasize the fact that various minor changes in details of construction, proportion and arrangement of parts may be resorted to, when required without sacrificing any of the advantages of my invention as set forth.

What is claimed is:—

A fruit picker comprising a pair of substantially inverted bowed U-shaped frames having straight horizontally disposed abutting bight portions, the lower portions of the legs of the frames being converged and secured together, shanks carried by the frames at the converged portions of the legs and arranged in parallel relation to each other, eyes formed in the shanks intermediate their ends, a pivot pin arranged in said eyes, operating handles carried by the free ends of the shanks, upwardly and inwardly extending elongated knives carried by the bight portion of the frames, bars carried by the legs of the frames adjacent to the bight portion of the frames in parallel relation thereto, and a flexible sack carried by the parallel bars and arranged between the bight portions of the frames, as and for the purpose specified.

In testimony whereof I affix my signature in presence of two witnesses.

ANNA L. FUNK.

Witnesses:
H. H. BERG,
J. BUCKMAN.